(12) United States Patent
Chen et al.

(10) Patent No.: US 8,660,553 B2
(45) Date of Patent: Feb. 25, 2014

(54) METHOD AND SYSTEM FOR BYPASSING CALLED INTELLIGENCE

(75) Inventors: Jianhong Chen, Shenzhen (CN); Xiaofei Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 168 days.

(21) Appl. No.: 13/393,301

(22) PCT Filed: May 21, 2010

(86) PCT No.: PCT/CN2010/073048
§ 371 (c)(1),
(2), (4) Date: Feb. 29, 2012

(87) PCT Pub. No.: WO2011/032395
PCT Pub. Date: Mar. 24, 2011

(65) Prior Publication Data
US 2012/0165000 A1 Jun. 28, 2012

(30) Foreign Application Priority Data
Sep. 16, 2009 (CN) .......................... 2009 1 0171890

(51) Int. Cl.
*H04W 48/18* (2009.01)
(52) U.S. Cl.
USPC .......................... 455/432.1; 455/418; 370/329
(58) Field of Classification Search
USPC ........ 455/418, 432.1–433, 435.1–435.3, 439, 455/560; 370/216, 329
See application file for complete search history.

(56) References Cited

U.S. PATENT DOCUMENTS

| | | |
|---|---|---|
| 6,795,444 B1 * | 9/2004 | Vo et al. .......................... 370/401 |
| 6,928,277 B1 * | 8/2005 | Ene ................................ 455/411 |
| 8,265,696 B1 * | 9/2012 | Verkama ........................ 455/560 |
| 2007/0030338 A1 * | 2/2007 | Jiang et al. .................. 348/14.01 |

(Continued)

FOREIGN PATENT DOCUMENTS

| | | |
|---|---|---|
| CN | 1449616 A | 10/2003 |
| CN | 1585450 A | 2/2005 |

(Continued)

OTHER PUBLICATIONS

International Search Report for PCT/CN2010/073048 dated Aug. 2, 2010.

*Primary Examiner* — Kashif Siddiqui
*Assistant Examiner* — Khawar Iqbal
(74) *Attorney, Agent, or Firm* — Ling Wu; Stephen Yang; Ying and Yang Intellectual Property (57) ABSTRACT

The invention provides a method for bypassing intelligent services of a called user, applied in the case that a GMSC and VMSC are not the same MSC. The method comprises: the GMSC sending information to the VMSC as to whether the intelligent services of the called user are bypassed in the GMSC; the VMSC determining whether the intelligent services are bypassed in the GMSC, and determining whether the intelligent services are bypassed in the VMSC; and when the VMSC determines that the intelligent services are bypassed in the GMSC and are not bypassed in the VMSC, the VMSC not triggering the intelligent services; when the VMSC determines that the intelligent services are not bypassed in the GMSC and are bypassed in the VMSC, the VMSC sending a call release message to the GMSC. The invention further provides a system and VMSC for bypassing intelligent services of a called user.

15 Claims, 5 Drawing Sheets

(56) References Cited

U.S. PATENT DOCUMENTS

| | | |
|---|---|---|
| 2007/0281669 A1* | 12/2007 | Jiang .......................... 455/414.1 |
| 2010/0093307 A1* | 4/2010 | Hui et al. ................... 455/404.2 |
| 2010/0103888 A1* | 4/2010 | Takano et al. ................ 370/329 |
| 2010/0159923 A1* | 6/2010 | Tanabe et al. .............. 455/432.1 |
| 2010/0220667 A1* | 9/2010 | Noldus et al. ................ 370/329 |
| 2011/0081907 A1* | 4/2011 | Yang et al. .................... 455/433 |

FOREIGN PATENT DOCUMENTS

| | | |
|---|---|---|
| CN | 101047971 A | 10/2007 |
| CN | 101697639 A | 4/2010 |
| KR | 20070084755 A | 8/2007 |

\* cited by examiner

METHOD AND SYSTEM FOR BYPASSING CALLED INTELLIGENCE

TECHNICAL FIELD

The present invention relates to mobile network field, and more particularly, to a method and system for bypassing intelligent services of a called user in the case where a failure occurs in a Service Control Point (SCP) in which the called user is located and a Mobile Switching Center (MSC) in which a location request of the called user is located and a MSC in which the current location of the called user are not same MSC in a CDMA mobile network.

BACKGROUND OF THE RELATED ART

A failure occurring in a SCP of an intelligent network element or interruption of communication between a MSC and the SCP will cause users under the SCP to be unable to make calls, bringing losses to operators. In order to overcome this problem, a method for calculating bypass SCP of a called user is proposed in the field. In this method, the status or communication situation of the SCP is determined before interaction with the SCP, if it is normal, the current call connection triggers normally a trigger to the SCP, if it is abnormal, the call connection does not trigger the trigger, and connect the user as a non-intelligent user. Fees are accounted, compensated and deducted according to a bill output by the MSC to minimize losses of the operators and improve customer satisfaction.

In a Code Division Multiple Access (CDMA) mobile telecommunication network, a intelligence trigger of a called user triggers two MSCs, first a gateway office—a Gateway Mobile Switching Center (GMSC) which is a MSC that initiates a location request of the called user (and also has the function of a Service Switch Point (SSP)), and then a end office—a Visited Mobile Switching Centre (VMSC) which is a MSC in which the current location of the called user is located. Therefore, intelligent services of the called user may be bypassed because of failures of communication between the GMSC and a SCP of the called user, and if the communication between the GMSC and the SCP is normal, the intelligent services of the called user will not be bypassed, the call thus will still fail. Conversely, if the SCP are not bypassed in the GMSC and the SCP is bypassed in the VMSC, the call will fail as well.

A specific scenario where a call failure is caused when the GMSC and the VMSC are not the same MSC and situations as to whether the intelligent services of the called user are bypassed are different in the GMSC and the VMSC will be described in detail below by taking primary-backup disaster recovery of a MSC as an example. Of course, such a problem is not limited to be caused by the primary-backup disaster recovery, it may exist in various disaster recoveries of the MSC.

Figure 1:
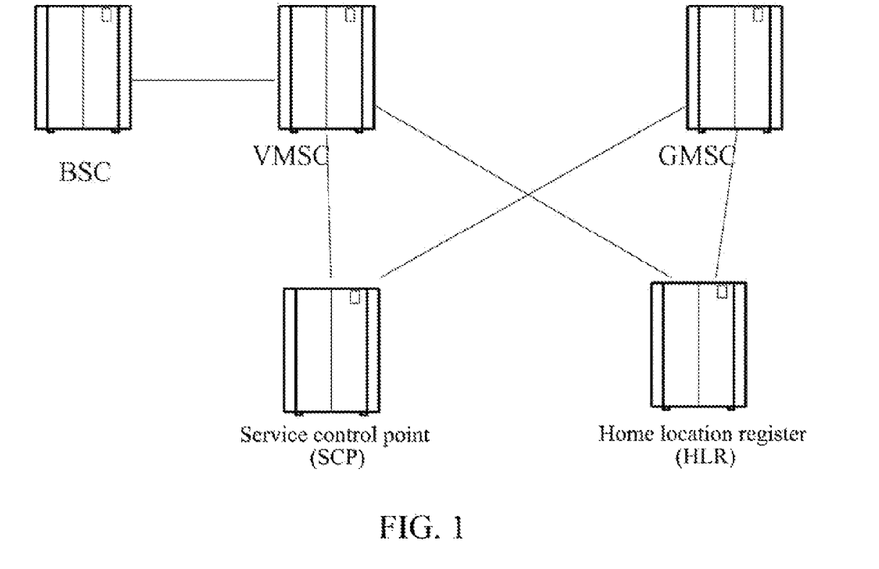
FIG. 1 is a structural diagram of an intelligence network of a CDMA mobile network.

FIG. 1 is a structural diagram of an intelligent network of a CDMA mobile network. Normally, when a MSC discovers that a user is an intelligent user, it needs to interact with a SCP when connecting a call of the user. An intelligent trigger list of the called user is obtained from a Home Location Register (HLR) by registration, qualification indication or qualification request. The intelligent trigger list of the called user may be obtained in another way, that is, it is obtained by a gateway office through a location request.

Figure 2:
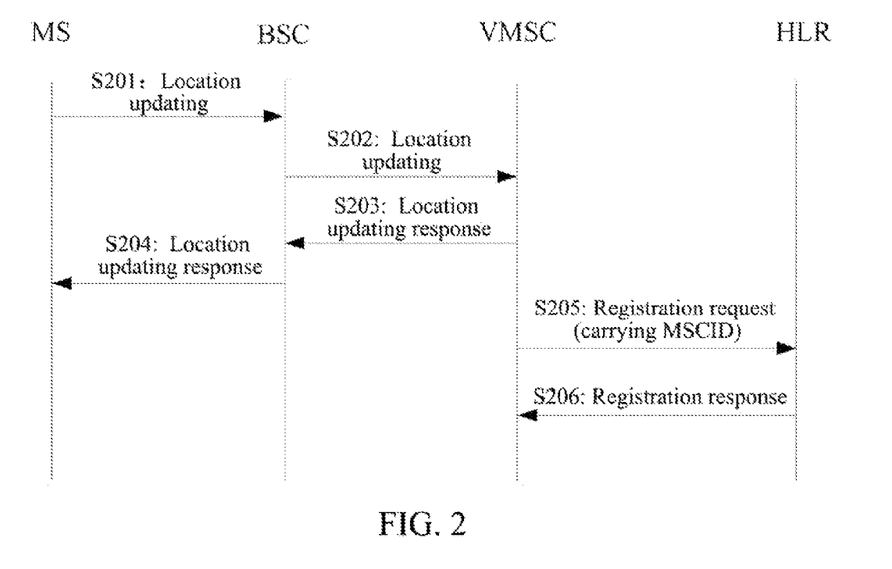
FIG. 2 is a flowchart of a process for obtaining an intelligent trigger list of a called user in prior art.

FIG. 2 illustrates a flowchart of a process of how an end office VMSC obtains an intelligent trigger list of q called user.

In S201, a Mobile Station (MS) initiates a location updating request to a Base Station Controller (BSC).

In S202, the BSC receives the location updating request and then sends it to a MSC in which the called user is located, i.e., the VMSC.

In S203, the VMSC returns a location updating response to the BSC after receiving the location updating request of the BSC.

In S204, the BSC receives the location updating response and then sends it to the MS.

In S205, if the VMSC needs to send registration (change in the location of the MS is great or start-up registration) to a HLR, the VMSC sends a registration request to the HLR.

In S206, the HLR receives the registration request, updates user information, and returns a register response carrying the intelligent trigger list of the called user to the VMSC.

Figure 3:
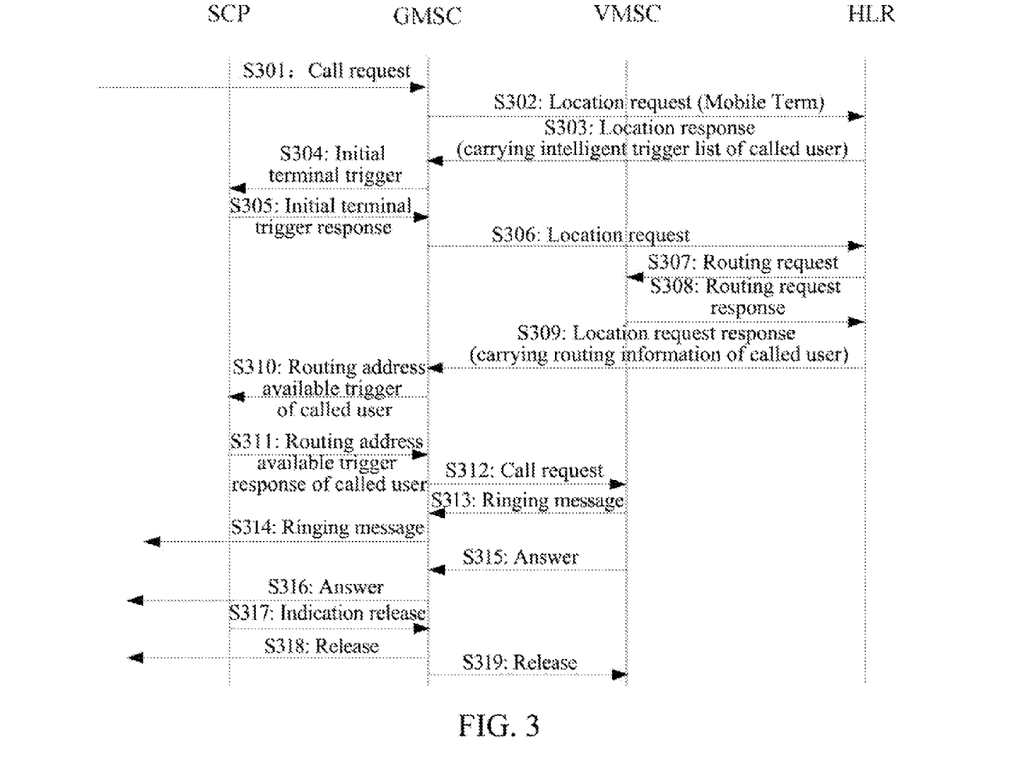
FIG. 3 is a flowchart of a call in the case where intelligent services are not bypassed in a gateway office and the intelligent services are bypassed in an end office and a location request and a current location of a called user are not in the same MSC in prior art.

Referring to FIG. 3 below, which illustrates a case where the existing gateway office GMSC and end office VMSC are not the same MSC and the gateway office GMSC determines that intelligent services of a called user are not required to be bypassed and the end office VMSC determines that the intelligent services of the called user are required to be bypassed.

In S301, a front office sends a call request to the gateway office GMSC.

In S302, the GMSC receives the call request and then sends a location request to a HLR.

In S303, the HLR receives the location request, queries user information contained in the location request, and returns a location response carrying an intelligent trigger list of the called user to the gateway office GMSC when discovering that the user is an intelligent user.

In S304, the gateway office GMSC receives the location response, finds the intelligent trigger list of the called user, determines that the intelligent services of the called user are not required to be bypassed according to the intelligent trigger list of the called user (e.g., whether failures occur in a corresponding SCP), and sends an initial terminal trigger to the SCP.

In S305, the gateway office GMSC receives an initial terminal trigger response returned by the SCP.

In S306, the gateway office GMSC sends a location request to the HLR, wherein the trigger is a location trigger.

In S307, the HLR sends a routing request to the end office VMSC.

In S308, the end office VMSC returns a routing request response to the HLR.

In S309, the HLR returns a location request response carrying routing information of the called user to the gateway office GMSC.

In S310, the gateway office GMSC sends a routing address available trigger of the called user to the SCP.

In S311, the SCP sends a routing address available trigger response to the gateway office GMSC.

In S312, the gateway office GMSC receives the routing address available trigger response from the SCP and then analyses a number to obtain routing of the corresponding service MSC, and sends a call request to the end office VMSC.

In S313, the end office VMSC receives the call request and finds that the called user is a local office user and is an intelligent user, continues to determine whether the intelligent services of the called user are required to be bypassed in the VMSC, if they are required to be bypassed, the end office VMSC connects the called user, and when the called user is ringing, the end office VMSC sends the ringing to the gateway office GMSC.

In S314, the gateway office GMSC forwards the ringing to the front office.

In S315, the called user answers, and the end office VMSC sends an answer to the gateway office GMSC.

In this step, the answer sent by the end office VMSC to the gateway office GMSC corresponds to an answer to a call request sent by the gateway office GMSC to the end office VMSC.

In S316, the gateway office GMSC forwards the answer to the front office, and a calling user and the called user begin to talk.

In S317, because the SCP does not receive an answer trigger for a long time, it sends a message to the GMSC to indicate to release the call.

The step S317 is also the reason for failure of the call in the case where the gateway office GMSC and the end office VMSC are not the same MSC and the intelligent services of the called user are not bypassed in the gateway office GMSC and the intelligent services of the called user are bypassed in the end VMSC. That is to say, because the intelligent services of the called user at the SCP are triggered in the gateway office GMSC and the intelligent services of the called user are required to be bypassed in the VMSC, the answer trigger cannot be returned to the SCP such that the SCP believes that an error occurs and releases the call because it does not receive the answer trigger for a long time.

In S318, the gateway office GMSC sends a release call message to the front office.

In S319, the gateway office GMSC sends a release message to the end office VMSC.

Then referring to FIG. 4 below, which illustrates a case where the existing gateway office GMSC and end office VMSC are not the same MSC and the gateway office GMSC determines that intelligent services of a called user are required to be bypassed and the end office VMSC determines that the intelligent services of the called user are not required to be bypassed.

In S401, a front office sends a call request to the gateway office GMSC.

In S402, the GMSC receives the call request and then sends a location request to a HLR.

In S403, the HLR receives the location request, queries user information contained in the location request, and returns a location response carrying an intelligent trigger list of the called user to the gateway office GMSC when discovering that the user is an intelligent user.

In S404, the gateway office GMSC receives the location response, finds the intelligent trigger list of the called user, determines that the intelligent services of the called user are required to be bypassed according to the intelligent trigger list of the called user (e.g., whether failures occur in a corresponding SCP), and sends the location request to the SCP, wherein the trigger is a location trigger.

In S405, the HLR sends a routing request to the end office VMSC.

In S406, the end office VMSC returns a routing request response to the HLR.

In S407, the HLR returns a location request response carrying routing information of the called user to the gateway office GMSC.

In S408, the gateway office GMSC sends a call request to the end office VMSC.

In S409, the end office VMSC receives the call request and finds that the called user is a local office user and is an intelligent user, continues to determine whether the intelligent services of the called user are required to be bypassed in the VMSC, if they are not required to be bypassed, the end office VMSC connects the called user, and when the called user is ringing, the end office VMSC sends the ringing to the gateway office GMSC.

In S410, the gateway office GMSC forwards the ringing to the front office.

In S411, the called user answers, and the end office VMSC sends an answer to the SCP.

In S412, the end office VMSC sends an answer to the gateway office GMSC.

In S413, the gateway office GMSC forwards the answer to the front office, and a calling user and the called user begin to talk.

In S414, because the SCP has not received a trigger previously and received directly the answer, it may believe that an error occurs and send a release indication to the end office VMSC.

The step S414 is just the reason for failure of the call in the case where the gateway office GMSC and the end office VMSC are not the same MSC and the intelligent services of the called user are bypassed in the gateway office GMSC and the intelligent services of the called user are not bypassed in the end VMSC. That is to say, because the intelligent services of the called user are bypassed in the gateway office GMSC and the intelligent services of the called user are not triggered and the end office VMSC triggers the intelligent services of the called user and returns an answer trigger to the SCP such that the SCP receives the answer directly without receiving the trigger and determines that an error occurs and releases the call.

In S415, the gateway office GMSC sends a release call message to the front office.

In S416, the gateway office GMSC sends a release message to the end office VMSC.

Figure 4:
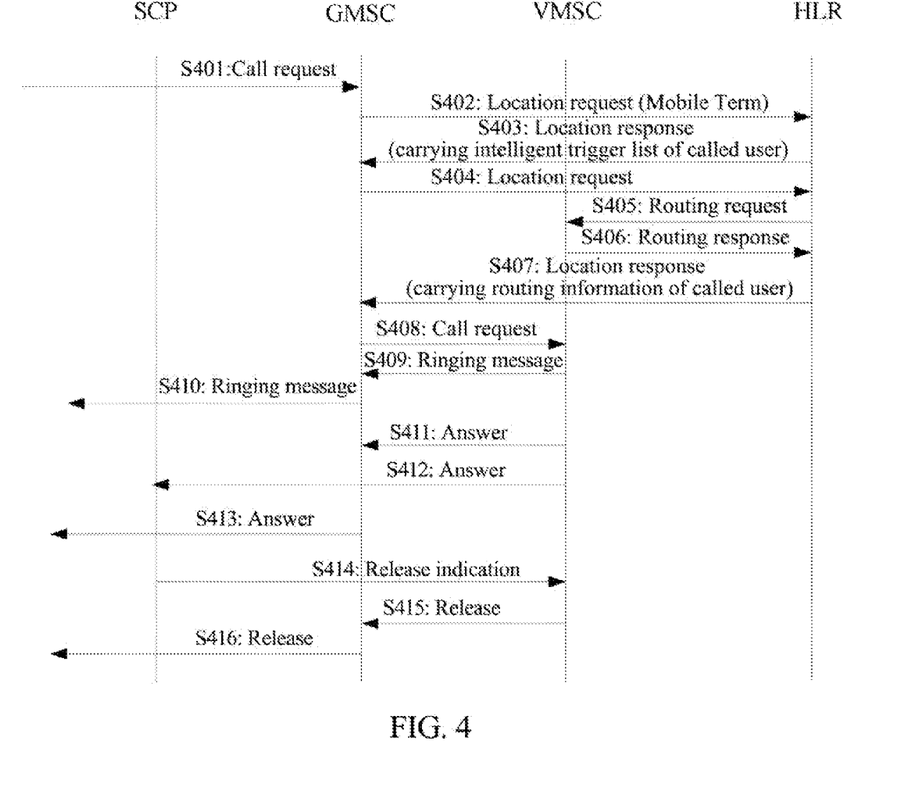
FIG. 4 is a flowchart of a call in the case where intelligent services are bypassed in a gateway office and the intelligent services are not bypassed in an end office and a location request and a current location of a called user are not in the same MSC in prior art.

Deficiencies in above FIG. 3 and FIG. 4 are not limited to be caused by primary-backup disaster recovery, they may exist in various disaster recoveries of the MSC. Currently, there is no corresponding solution to the problem that call failure is caused when the GMSC and the VMSC are not the same MSC and situations as to whether the intelligent services of the called user are bypassed are different in the GMSC and the VMSC.

CONTENT OF THE INVENTION

The technical problem to be solved by the present invention is to provide a method and system for bypassing intelligent services of a called user so as to solve the problem of call failure caused when a GMSC and a VMSC are not the same MSC.

In order to solve the above-mentioned problem, the present invention provides a method for bypassing intelligent services of a called user, applied in the case that a gateway mobile switching centre (GMSC) and a visited mobile switching centre (VMSC) are not the same MSC, during a call, the method comprises:

the GMSC sending information to the VMSC as to whether the intelligent services of the called user are bypassed in the GMSC;

the VMSC determining whether the intelligent services of the called user are bypassed in the GMSC based on the information as to whether the intelligent services of the called user are bypassed in the GMSC, and determining whether the intelligent services of the called user are bypassed in the VMSC; and when the VMSC determines that the intelligent services of the called user are bypassed in the GMSC and that the intelligent services of the called user are not bypassed in the VMSC, the VMSC not triggering the intelligent services of the called user; when the VMSC determines that the intelligent services of the called user are not bypassed in the GMSC and that the intelligent services of the called user are bypassed in the VMSC, the VMSC sending a call release message to the GMSC, thereby implementing complete bypassing of the intelligent services of the called user.

The method further comprises:

when the VMSC determines that the intelligent services of the called user are bypassed in the GMSC and that the intelligent services of the called user are bypassed in the VMSC, bypassing the intelligent services of the called user in the VMSC; and when the VMSC determines that the intelligent services of the called user are not bypassed in the GMSC and that the intelligent services of the called user are not bypassed in the VMSC, not bypassing the intelligent services of the called user in the VMSC.

In the step of the GMSC sending the information to the VMSC as to whether the intelligent services of the called user are bypassed in the GMSC, the GMSC sends a location request carrying the information to the VMSC by a home location register (HLR) as to whether the intelligent services of the called user are bypassed in the GMSC.

The step of the GMSC sending the information to the VMSC as to whether the intelligent services of the called user are bypassed in the GMSC comprises: the GMSC obtaining an intelligent trigger list of the called user from the HLR, analyzing whether the intelligent services of the called user are bypassed in the GMSC based on the intelligent trigger list of the called user, setting an intelligence bypass identifier based on whether the intelligent services of the called user are bypassed in the GMSC, and sending a location request carrying the intelligence bypass identifier to the VMSC by the HLR.

In the step of the VMSC determining whether the intelligent services of the called user are bypassed in the GMSC based on the information as to whether the intelligent services of the called user are bypassed in the GMSC, the VMSC determines whether the intelligent services of the called user are bypassed in the GMSC based on the received intelligence bypass identifier.

When the VMSC determines that the intelligent services of the called user are bypassed in the GMSC and that the intelligent services of the called user are not bypassed in the VMSC, the method further comprises: the VMSC not sending an answer indication to a service control point (SCP) and sending a call request answer to the GMSC, and the GMSC forwarding the call request answer to a front office such that a calling user and a called user begin to talk.

In order to solve the above technical problem, the present invention also provides a system for bypassing intelligent services of a called user, applied in the case that a gateway mobile switching centre (GMSC) and a visited mobile switching centre (VMSC) are not the same MSC, wherein the GMSC is configured to send information to the VMSC as to whether the intelligent services of the called user are bypassed in the GMSC; and the VMSC is configured to determine whether the intelligent services of the called user are bypassed in the GMSC based on the information as to whether the intelligent services of the called user are bypassed in the GMSC, and determine whether the intelligent services of the called user are bypassed in the VMSC, and when the VMSC determines that the intelligent services of the called user are bypassed in the GMSC and that the intelligent services of the called user are not bypassed in the VMSC, not to trigger the intelligent services of the called user, and when the VMSC determines that the intelligent services of the called user are not bypassed in the GMSC and that the intelligent services of the called user are bypassed in the VMSC, send a call release message to the GMSC, thereby supporting complete bypassing of the intelligent services of the called user.

The VMSC is further configured to bypass the intelligent services of the called user when the VMSC determines that the intelligent services of the called user are bypassed in the GMSC and that the intelligent services of the called user are bypassed in the VMSC, and not to bypass the intelligent services of the called user when the VMSC determines that the intelligent services of the called user are not bypassed in the GMSC and that the intelligent services of the called user are not bypassed in the VMSC.

The system further comprises a home location register (HLR).

The GMSC is configured to send a location request carrying the information to the VMSC by the HLR as to whether the intelligent services of the called user are bypassed in the GMSC.

The GMSC is configured to send the information to the VMSC through the HLR as to whether the intelligent services of the called user are bypassed in the GMSC by obtaining an intelligent trigger list of the called user from the HLR, analyzing whether the intelligent services of the called user are bypassed in the GMSC based on the intelligent trigger list of the called user, setting an intelligence bypass identifier based on whether the intelligent services of the called user are bypassed in the GMSC, and sendding a location request carrying the intelligence bypass identifier to the VMSC by the HLR.

The VMSC is configured to determine whether the intelligent services of the called user are bypassed in the GMSC based on the received intelligence bypass identifier.

The VMSC is further configured to, when determining that the intelligent services of the called user are bypassed in the GMSC and that the intelligent services of the called user are not bypassed in the VMSC, not to send an answer indication to a service control point (SCP), and send a call request answer to the GMSC; and the GMSC is configured to forward the call request answer to a front office such that a calling user and the called user begin to talk.

In order to solve the above technical problem, the present invention also provides a visited mobile switching center (VMSC), the VMSC and a gateway mobile switching center (GMSC) being not the same mobile switching center (MSC), wherein the VMSC comprises:

an information receiving module configured to receive information as to whether intelligent services of a called user are bypassed in the GMSC; and a bypassing called user intelligent services indicating module configured to determine whether the intelligent services of the called user are bypassed in the GMSC based on the information as to whether the intelligent services of the called user are bypassed in the GMSC, and determine whether the intelligent services of the called user are bypassed in the VMSC, and when determining that the intelligent services of the called user are bypassed in the GMSC and that the intelligent services of the called user are not bypassed in the VMSC, not to trigger the intelligent services of the called user, and when determining that the intelligent services of the called user are not bypassed in the GMSC and that the intelligent services of the called user are bypassed in the VMSC, send a call release message to the GMSC, thereby supporting complete bypassing of the intelligent services of the called user.

The bypassing called user intelligent services indicating module is further configured to bypass the intelligent services of the called user in the VMSC when the VMSC determines that the intelligent services of the called user are bypassed in the GMSC and that the intelligent services of the called user are bypassed in the VMSC, and not to bypass the intelligent services of the called user in the VMSC when the VMSC determines that the intelligent services of the called user are not bypassed in the GMSC and that the intelligent services of the called user are not bypassed in the VMSC.

The bypassing called user intelligent services indicating module is further configured to, when determining that the intelligent services of the called user are bypassed in the GMSC and that the intelligent services of the called user are not bypassed in the VMSC, not to send an answer indication to a service control point (SCP), and send a call request answer to the GMSC, to cause the GMSC to forward the call request answer to a front office such that a calling user and a called user begin to talk.

The method and system for bypassing the intelligent services of the called user completely in accordance with the present invention effectively solve the problem of call failure caused when the GMSC and the VMSC are not the same MSC, and are simple and easy to implement.

PREFERRED EMBODIMENTS OF THE PRESENT INVENTION

Embodiments of the present invention will be described in detail in combination with the accompanying drawings.

In this embodiment of the present invention, the solution of the present invention will be described in detail by taking deficiencies existing in a primary-backup disaster recovery instance of the existing MSC mentioned in the background of the related art as example.

Figure 5:
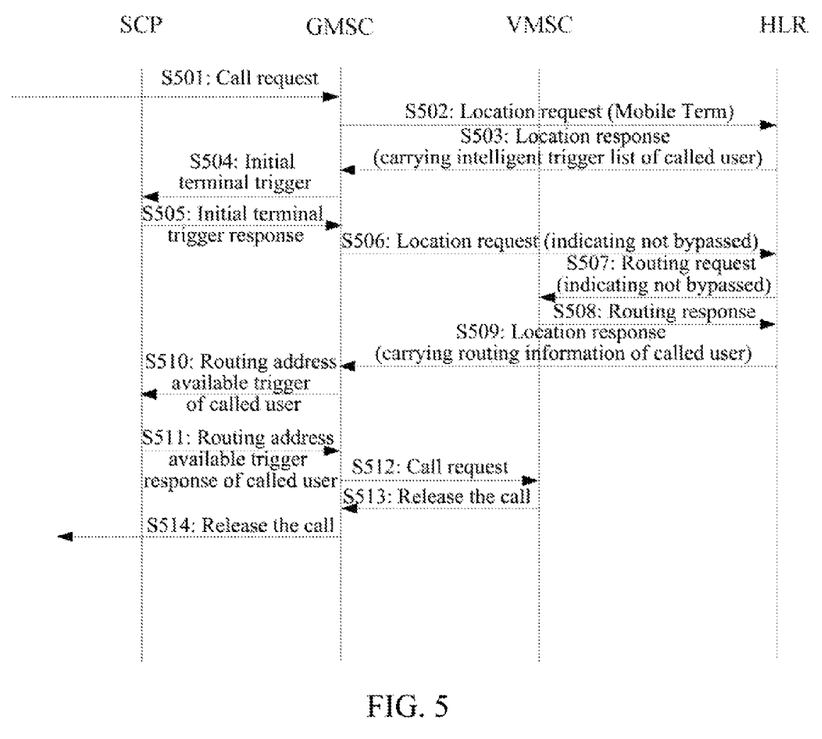
FIG. 5 is a flowchart of a call in the case where intelligent services are not bypassed in a gateway office and the intelligent services are required to be bypassed in an end office and a location request and a current location of a called user are not in the same MSC in accordance with the present invention.

In order to avoid occurrence of the situation shown in FIG. 3 where call failure is caused when intelligent services of a called user are bypassed in an end office, for the case where a gateway office GMSC and a service end office VMSC are not the same MSC and the gateway office GMSC determines that the intelligent services of the called user are not required to be bypassed, the present invention proposes the following solution, which, as shown in FIG. 5, comprises the following steps.

In S501, a front office sends a call request to the gateway office GMSC.

In S502, the GMSC receives the call request and then sends a location request to a HLR.

In S503, the HLR receives the location request, queries user information contained in the location request, and returns a location response carrying an intelligent trigger list of the called user to the gateway office GMSC when discovering that the user is an intelligent user.

In S504, the gateway office GMSC receives the location response, finds the intelligent trigger list of the called user, determines that the intelligent services of the called user are not required to be bypassed according to the intelligent trigger list of the called user (e.g., whether failures occur in a corresponding SCP), and sends an initial terminal trigger to the SCP.

In S505, the gateway office GMSC receives an initial terminal trigger response returned by the SCP.

In S506, the gateway office GMSC sends a location request carrying an intelligence bypass identifier to the HLR, the intelligence bypass identifier indicating that the intelligent services of the called user are bypassed in the GMSC, wherein the trigger is the initial terminal trigger.

In S507, the HLR sends a routing request carrying the intelligence bypass identifier to the end office VMSC.

In S508, the end office VMSC receives the routing request sent by the HLR, then determines that the intelligent services of the called user are not bypassed in the GMSC based on the intelligence bypass identifier in the routing request, records information that the intelligent services of the called user are not bypassed currently in the GMSC at the VMSC side, and then returns a routing request response to the HLR.

In S509, the HLR returns a location request response carrying routing information of the called user to the gateway office GMSC.

In S510, the gateway office GMSC triggers a routing address available trigger of the called user to the SCP.

In S511, the gateway office GMSC receives a routing address available trigger response from the HLR, and then analyses a number to obtain routing of the corresponding service MSC, i.e., routing of the VMSC, and sends a call request to the end office VMSC.

In S512, the end office VMSC receives the call request and finds that the called user is a local office user and is an intelligent user, continues to determine whether the intelligent services of the called user are required to be bypassed in the VMSC, if they are required to be bypassed, determines the information recorded at the end office VMSC side as to whether the intelligent services of the called user are bypassed in the GMSC, and finds that the intelligent services of the called user are not bypassed in the GMSC.

In S513, the gateway office GMSC forwards a call release message to the end office VMSC.

That is to say, in the present invention, when the gateway office GMSC and the end office VMSC are not the same MSC, the GMSC notifies the VMSC whether the intelligent services of the called user are bypassed in the GMSC, and when the VMSC connects the call, if the intelligent services of the called user are not bypassed in the GMSC and the intelligent services of the called user are required to be bypassed in the VMSC, the VMSC sends the call release message to the GMSC. Of course, if it is determined that the intelligent services of the called user are not bypassed in the GMSC and the intelligent services of the called user are not required to be bypassed in the VMSC when the VMSC connects the call, the intelligent services of the called user are not bypassed in the VMSC, thus the normal call will be realized, and the case that the call failure is caused when situations as to whether the intelligent services of the called user are bypassed are different in the GMSC and the VMSC will not occur, which therefore will not be repeated herein.

In S514, the gateway office GMSC forwards the call release message to a front office to cause the called user to release the call.

Figure 6:
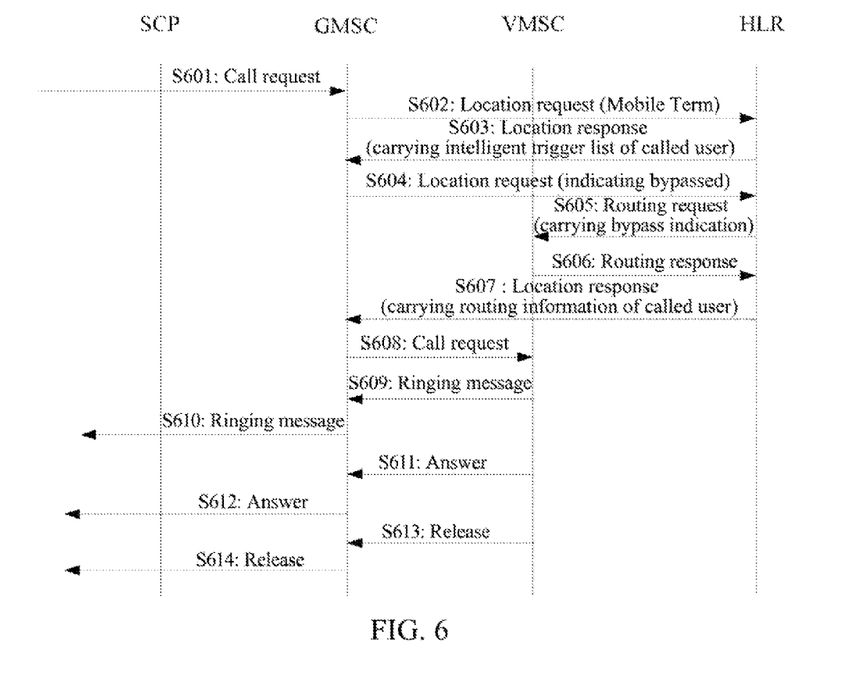
FIG. 6 is a flowchart of a call in the case where intelligent services are bypassed in a gateway office and a location request and a current location of a called user are not in the same MSC in prior art in accordance with the present invention.

In order to avoid occurrence of the situation shown in FIG. 4 where call failure is caused when intelligent services of a called user are not bypassed in an end office, for the case where a gateway office GMSC and a service end office VMSC are not the same MSC and the gateway office GMSC determines that the intelligent services of the called user are required to be bypassed, the present invention proposes the following solution, which, as shown in FIG. 6, comprises the following steps.

In S601, a front office sends a call request to the gateway office GMSC.

In S602, the GMSC receives the call request and then sends a location request to a HLR.

In S603, the HLR receives the location request, queries user information contained in the location request, and returns a location response carrying an intelligent trigger list of the called user to the gateway office GMSC when discovering that the user is an intelligent user.

In S604, the gateway office GMSC receives the location response, finds the intelligent trigger list of the called user, determines that the intelligent services of the called user are required to be bypassed according to the intelligent trigger list of the called user (e.g., whether failures occur in a corresponding SCP), and sends a location request carrying an intelligence bypass identifier to the HLR, the intelligence bypass identifier indicating that the intelligent services of the called user are bypassed in the GMSC, wherein the trigger is the initial terminal trigger.

In S605, the HLR sends a routing request carrying the intelligence bypass identifier to the end office VMSC.

In S606, the end office VMSC receives the routing request sent by the HLR, then determines that the intelligent services of the called user are bypassed in the GMSC based on the intelligence bypass identifier in the routing request, records information that the intelligent services of the called user are bypassed currently in the GMSC at the VMSC side, and then returns a routing request response to the HLR.

In S607, the HLR returns a location request response carrying routing information of the called user to the gateway office GMSC.

In S608, the gateway office GMSC sends a call request to the end office VMSC according the routing information of the called user, and the end office VMSC receives the call request and connects the called user.

In S609, when the called user rings, the end office VMSC sends the ringing to the gateway office GMSC.

In S610, the gateway office GMSC forwards the ringing to the front office.

In S611, the called user answers, and the end office VMSC finds that the called user is local user and is an intelligent user, continues to determine whether the intelligent services of the called user are required to be bypassed in the VMSC, determines the information recorded at the end office VMSC side as to whether the intelligent services of the called user are bypassed in the GMSC when finding that the intelligent services of the called user are not required to be bypassed, and does not send a answer indication to the SCP and sends a answer to the gateway office GMSC when finding that the intelligent services of the called user are bypassed in the GMSC.

That is to say, in the present invention, when the gateway office GMSC and the service end office VMSC are not the same MSC, the GMSC notifies the VMSC whether the intelligent services of the called user are bypassed in the GMSC, and when the VMSC connects the call, if the intelligent services of the called user are bypassed in the GMSC and the intelligent services of the called user are not required to be bypassed in the VMSC, the VMSC does not trigger the intelligent services of the called user, i.e., does not send the answer indication to the SCP. Of course, if the VMSC determines that the intelligent services of the called user are bypassed in the GMSC and the intelligent services of the called user is also required to be bypassed in the VMSC when connecting the call, the intelligent services of the called user are bypassed in the VMSC, thus the normal call will be realized, and the case that the call failure is caused when situations as to whether the intelligent services of the called user are bypassed are different in the GMSC and the VMSC will not occur, which therefore will not be repeated herein.

In S612, the gateway office GMSC forwards the answer to the front office such that a calling user and the called user begin to talk.

In S613, when the talking ends, the called user releases the call, and the end office VMSC sends a release message to the gateway office GMSC.

In S614, the gateway office GMSC sends the release message to the front office to release the call.

In order to implement the method described above, the present invention also provides a system, applied in the case that the gateway office GMSC and the end office VMSC are not the same MSC, which comprises a GMSC, a VMSC, a HLR and a SCP.

The GMSC is configured to notify the VMSC of information as to whether intelligent services of a called user are bypassed in the GMSC.

Specifically, the GSMC is configured to send a location request carrying the information to the VMSC as to whether the intelligent services of the called user are bypassed in the GMSC.

After the GMSC obtains an intelligent trigger list of the called user from a HLR and analyzes whether the intelligent services of the called user are bypassed in the GMSC based on the intelligent trigger list of the called user, it may set an intelligence bypass identifier based on whether the intelligent services of the called user are bypassed in the GMSC, and send a location request carrying the intelligence bypass identifier to the VMSC, which determines the received intelligence bypass identifier to obtain the information as to whether the intelligent services of the called user are bypassed in the GMSC.

The VMSC is configured to process the call according to the information as to whether the intelligent services of the called user are bypassed in the GMSC. Specifically, the VMSC does not trigger the intelligent services of the called user when determining that the intelligent services of the called user are bypassed in the GMSC and the intelligent services of the called user are not required to be bypassed in the VMSC, and send a call release message to the GMSC when determining that the intelligent services of the called user are not bypassed in the GMSC and the intelligent services of the called user are required to be bypassed in the VMSC. When the VMSC determines that the intelligent services of the called user are bypassed in the GMSC and the intelligent services of the called user are required to be bypassed in the VMSC, the intelligent services of the called user are bypassed in the VMSC; when the VMSC determines that the intelligent services of the called user are not bypassed in the GMSC and the intelligent services of the called user are not required to be bypassed in the VMSC, the intelligent services of the called user are not bypassed in the VMSC.

The VMSC is further configured to, when determining that the intelligent services of the called user are bypassed in the GMSC and the intelligent services of the called user are not required to be bypassed in the VMSC, not to send an answer indication to a SCP, and send a call request answer to the GMSC, which forwards the answer to a front office to realize talking between a calling user and a called user.

Accordingly, the present invention also provides a visited mobile switching center (VMSC), the VMSC and a gateway mobile switching center (GMSC) being not the same mobile switching center (MSC), wherein the VMSC comprises:

an information receiving module configured to receive information as to whether intelligent services of a called user are bypassed in the GMSC; and a bypassing called user intelligent services indicating module configured to determine whether the intelligent services of the called user are bypassed in the GMSC based on the information as to whether the intelligent services of the called user are bypassed in the GMSC, and determine whether the intelligent services of the called user are bypassed in the VMSC, and when determining that the intelligent services of the called user are bypassed in the GMSC and that the intelligent services of the called user are not bypassed in the VMSC, not to trigger the intelligent services of the called user, and when determining that the intelligent services of the called user are not bypassed in the GMSC and that the intelligent services of the called user are bypassed in the VMSC, send a call release message to the GMSC.

The bypassing called user intelligent services indicating module is further configured to bypass the intelligent services of the called user in the VMSC when the VMSC determines that the intelligent services of the called user are bypassed in the GMSC and that the intelligent services of the called user are bypassed in the VMSC, and not to bypass the intelligent services of the called user in the VMSC when the VMSC determines that the intelligent services of the called user are not bypassed in the GMSC and that the intelligent services of the called user are not bypassed in the VMSC.

The bypassing called user intelligent services indicating module is further configured to, when determining that the intelligent services of the called user are bypassed in the GMSC and that the intelligent services of the called user are not bypassed in the VMSC, not to send an answer indication to a service control point (SCP), and send a call request answer to the GMSC, to cause the GMSC to forward the call request answer to a front office such that a calling user and a called user begin to talk.

Other various embodiments of the present invention may also be possible. Various modifications and variations to the present invention may be made by those skilled in the art without departing from the spirit and essence of the present invention. However, these corresponding modifications and variations should be covered in the protection scope of the appended claims of the present invention.

INDUSTRIAL APPLICABILITY

The present invention effectively solves the problem of call failure caused when the GMSC and the VMSC are not the same MSC in a simple and easy manner.

What we claim is:

1. A method for bypassing intelligent services of a called user, applied in the case that a gateway mobile switching centre (GMSC) and a visited mobile switching centre (VMSC) are not the same MSC, during a call, the method comprising:

the GMSC sending information to the VMSC as to whether the intelligent services of the called user are bypassed in the GMSC;

the VMSC determining whether the intelligent services of the called user are bypassed in the GMSC based on the information as to whether the intelligent services of the called user are bypassed in the GMSC, and determining whether the intelligent services of the called user are bypassed in the VMSC; and when the VMSC determines that the intelligent services of the called user are bypassed in the GMSC and that the intelligent services of the called user are not bypassed in the VMSC, the VMSC not triggering the intelligent services of the called user; when the VMSC determines that the intelligent services of the called user are not bypassed in the GMSC and that the intelligent services of the called user are bypassed in the VMSC, the VMSC sending a call release message to the GMSC, thereby implementing complete bypassing of the intelligent services of the called user.

2. The method according to claim 1, further comprising:

when the VMSC determines that the intelligent services of the called user are bypassed in the GMSC and that the intelligent services of the called user are bypassed in the VMSC, bypassing the intelligent services of the called user in the VMSC; and when the VMSC determines that the intelligent services of the called user are not bypassed in the GMSC and that the intelligent services of the called user are not bypassed in the VMSC, not bypassing the intelligent services of the called user in the VMSC.

3. The method according to claim 2, wherein

In the step of the GMSC sending the information to the VMSC as to whether the intelligent services of the called user are bypassed in the GMSC, the GMSC sends a location request carrying the information to the VMSC by a home location register (HLR) as to whether the intelligent services of the called user are bypassed in the GMSC.

4. The method according to claim 1, wherein

In the step of the GMSC sending the information to the VMSC as to whether the intelligent services of the called user are bypassed in the GMSC, the GMSC sends a location request carrying the information to the VMSC by a home location register (HLR) as to whether the intelligent services of the called user are bypassed in the GMSC.

5. The method according to claim 4, wherein the step of the GMSC sending the information to the VMSC as to whether the intelligent services of the called user are bypassed in the GMSC comprises: the GMSC obtaining an intelligent trigger list of the called user from the HLR, analyzing whether the intelligent services of the called user are bypassed in the GMSC based on the intelligent trigger list of the called user, setting an intelligence bypass identifier based on whether the intelligent services of the called user are bypassed in the GMSC, and sending a location request carrying the intelligence bypass identifier to the VMSC by the HLR; and in the step of the VMSC determining whether the intelligent services of the called user are bypassed in the GMSC based on the information as to whether the intelligent services of the called user are bypassed in the GMSC, the VMSC determines whether the intelligent services of the called user are bypassed in the GMSC based on the received intelligence bypass identifier.

6. The method according to claim 1, wherein when the VMSC determines that the intelligent services of the called user are bypassed in the GMSC and that the intelligent services of the called user are not bypassed in the VMSC, the method further comprises: the VMSC not sending an answer indication to a service control point (SCP) and sending a call request answer to the GMSC, and the GMSC forwarding the call request answer to a front office such that a calling user and a called user begin to talk.

7. A system for bypassing intelligent services of a called user, applied in the case that a gateway mobile switching centre (GMSC) and a visited mobile switching centre (VMSC) are not the same MSC, wherein the GMSC is configured to send information to the VMSC as to whether the intelligent services of the called user are bypassed in the GMSC; and the VMSC is configured to determine whether the intelligent services of the called user are bypassed in the GMSC based on the information as to whether the intelligent services of the called user are bypassed in the GMSC, and determine whether the intelligent services of the called user are bypassed in the VMSC, and when the VMSC determines that the intelligent services of the called user are bypassed in the GMSC and that the intelligent services of the called user are not bypassed in the VMSC, not to trigger the intelligent services of the called user, and when the VMSC determines that the intelligent services of the called user are not bypassed in the GMSC and that the intelligent services of the called user are bypassed in the VMSC, send a call release message to the GMSC, thereby supporting complete bypassing of the intelligent services of the called user.

8. The system according to claim 7, wherein the VMSC is further configured to:

bypass the intelligent services of the called user when the VMSC determines that the intelligent services of the called user are bypassed in the GMSC and that the intelligent services of the called user are bypassed in the VMSC, and not to bypass the intelligent services of the called user when the VMSC determines that the intelligent services of the called user are not bypassed in the GMSC and that the intelligent services of the called user are not bypassed in the VMSC.

9. The method according to claim 8, further comprising a home location register (HLR), wherein the GMSC is configured to send a location request carrying the information to the VMSC by the HLR as to whether the intelligent services of the called user are bypassed in the GMSC.

10. The system according to claim 9, wherein the GMSC is configured to send the information to the VMSC through the HLR as to whether the intelligent services of the called user are bypassed in the GMSC by obtaining an intelligent trigger list of the called user from the HLR, analyzing whether the intelligent services of the called user are bypassed in the GMSC based on the intelligent trigger list of the called user, setting an intelligence bypass identifier based on whether the intelligent services of the called user are bypassed in the GMSC, and sending a location request carrying the intelligence bypass identifier to the VMSC by the HLR; and the VMSC is configured to determine whether the intelligent services of the called user are bypassed in the GMSC based on the received intelligence bypass identifier.

11. The system according to claim 7, wherein the VMSC is further configured to, when determining that the intelligent services of the called user are bypassed in the GMSC and that the intelligent services of the called user are not bypassed in the VMSC, not to send an answer indication to a service control point (SCP), and send a call request answer to the GMSC; and the GMSC is configured to forward the call request answer to a front office such that a calling user and the called user begin to talk.

12. A visited mobile switching center (VMSC), the VMSC and a gateway mobile switching center (GMSC) being not the same mobile switching center (MSC), wherein the VMSC comprises:

an information receiving module configured to receive information as to whether intelligent services of a called user are bypassed in the GMSC; and a bypassing called user intelligent services indicating module configured to determine whether the intelligent services of the called user are bypassed in the GMSC based on the information as to whether the intelligent services of the called user are bypassed in the GMSC, and determine whether the intelligent services of the called user are bypassed in the VMSC, and when determining that the intelligent services of the called user are bypassed in the GMSC and that the intelligent services of the called user are not bypassed in the VMSC, not to trigger the intelligent services of the called user, and when determining that the intelligent services of the called user are not bypassed in the GMSC and that the intelligent services of the called user are bypassed in the VMSC, send a call release message to the GMSC, thereby supporting complete bypassing of the intelligent services of the called user.

13. The VMSC according to claim 12, wherein the bypassing called user intelligent services indicating module is further configured to:

bypass the intelligent services of the called user in the VMSC when the VMSC determines that the intelligent services of the called user are bypassed in the GMSC and that the intelligent services of the called user are bypassed in the VMSC, and not to bypass the intelligent services of the called user in the VMSC when the VMSC determines that the intelligent services of the called user are not bypassed in the GMSC and that the intelligent services of the called user are not bypassed in the VMSC.

14. The VMSC according to claim 13, wherein the bypassing called user intelligent services indicating module is further configured to, when determining that the intelligent services of the called user are bypassed in the GMSC and that the intelligent services of the called user are not bypassed in the VMSC, not to send an answer indication to a service control point (SCP), and send a call request answer to the GMSC, to cause the GMSC to forward the call request answer to a front office such that a calling user and a called user begin to talk.

15. The VMSC according to claim 12, wherein
the bypassing called user intelligent services indicating module is further configured to, when determining that the intelligent services of the called user are bypassed in the GMSC and that the intelligent services of the called user are not bypassed in the VMSC, not to send an answer indication to a service control point (SCP), and send a call request answer to the GMSC, to cause the GMSC to forward the call request answer to a front office such that a calling user and a called user begin to talk.

* * * * *